United States Patent
Wang

(10) Patent No.: US 12,213,013 B2
(45) Date of Patent: Jan. 28, 2025

(54) CELL CONFIGURATION METHOD AND APPARATUS, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 428 days.

(21) Appl. No.: 17/739,187

(22) Filed: May 9, 2022

(65) Prior Publication Data

US 2022/0264393 A1 Aug. 18, 2022

Related U.S. Application Data

(63) Continuation of application No. PCT/CN2019/118555, filed on Nov. 14, 2019.

(51) Int. Cl.
*H04W 36/08* (2009.01)
*H04W 36/00* (2009.01)

(52) U.S. Cl.
CPC ... *H04W 36/0058* (2018.08); *H04W 36/0069* (2018.08); *H04W 36/00835* (2018.08); *H04W 36/0072* (2013.01)

(58) Field of Classification Search
CPC ......... H04W 36/0058; H04W 36/0069; H04W 36/00835; H04W 36/0072; H04W 60/04; H04W 24/02
See application file for complete search history.

(56) References Cited

U.S. PATENT DOCUMENTS

| | | | |
|---|---|---|---|
| 11,582,651 B2* | 2/2023 | Chen | H04W 36/08 |
| 2015/0271713 A1 | 9/2015 | Kim et al. | |
| 2018/0124612 A1 | 5/2018 | Babaei et al. | |
| 2020/0008113 A1* | 1/2020 | Chen | H04W 36/0085 |
| 2021/0007149 A1* | 1/2021 | Li | H04L 5/0091 |
| 2021/0014893 A1* | 1/2021 | Park | H04L 5/0092 |
| 2021/0099926 A1* | 4/2021 | Chen | H04W 36/08 |

(Continued)

FOREIGN PATENT DOCUMENTS

| | | | |
|---|---|---|---|
| CN | 106068658 | 11/2016 | |
| CN | 114246016 A * | 3/2022 | H04W 24/10 |

OTHER PUBLICATIONS

"Search Report of of counterpart Europe application No. 19952518.9", issued on Oct. 6, 2022, p. 1-p. 9.

(Continued)

*Primary Examiner* — Jay P Patel

(74) *Attorney, Agent, or Firm* — JCIP GLOBAL INC.

(57) ABSTRACT

Embodiments of the disclosure provide a cell configuration method and apparatus, a terminal device and a network device. The method comprises: a terminal device receiving first configuration information sent by a network device, the first configuration information comprising at least one secondary cell group (SCG) configuration, each of the at least one SCG configuration comprising configuration information of a plurality of cells, wherein at least one of the plurality of cells is configured as a candidate primary secondary cell (PSCell).

16 Claims, 4 Drawing Sheets

The network device sends first configuration information to the terminal device, and the terminal device receives the first configuration information sent by the network device. The first configuration information includes at least one SCG configuration, and each SCG configuration in the at least one SCG configuration includes configuration information of multiple cells, and at least one cell of the multiple cells is configured as a candidate PSCell.

401

(56) References Cited

U.S. PATENT DOCUMENTS

| | | | |
|---|---|---|---|
| 2022/0007443 A1* | 1/2022 | Xu | H04W 24/10 |
| 2022/0104259 A1* | 3/2022 | Li | H04W 74/0816 |
| 2022/0201638 A1* | 6/2022 | Arrobo Vidal | H04W 48/08 |
| 2022/0295366 A1* | 9/2022 | Teyeb | H04W 36/0058 |
| 2022/0338089 A1* | 10/2022 | Kim | H04W 36/34 |
| 2022/0377629 A1* | 11/2022 | Rugeland | H04W 36/0079 |
| 2022/0408325 A1* | 12/2022 | Da Silva | H04W 76/15 |
| 2022/0417804 A1* | 12/2022 | Freda | H04W 36/30 |
| 2023/0007553 A1* | 1/2023 | Rugeland | H04W 36/362 |
| 2024/0056917 A1* | 2/2024 | Kim | H04W 36/00835 |

OTHER PUBLICATIONS

CATT, "TP for TS37.340 BLCR Conditional SN Addition&Change Procedure", 3GPP TSG RAN WG3#106 R3-196727, Nov. 2019, pp. 1-28.

"International Search Report (Form PCT/ISA/210) of PCT/CN2019/118555", mailed on Aug. 5, 2020, with English translation thereof, pp. 1-6.

"Written Opinion of the International Searching Authority (Form PCT/ISA/237) of PCT/CN2019/118555", mailed on Aug. 5, 2020, with English translation thereof, pp. 1-7.

* cited by examiner

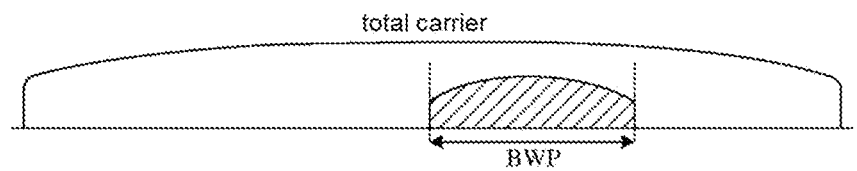

FIG. 3A

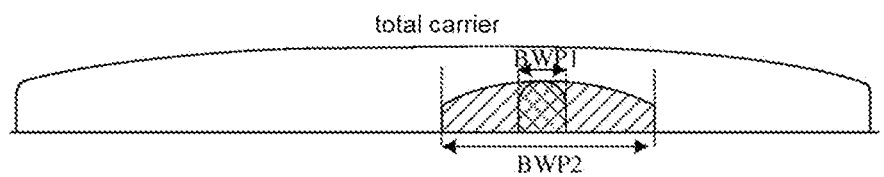

FIG. 3B

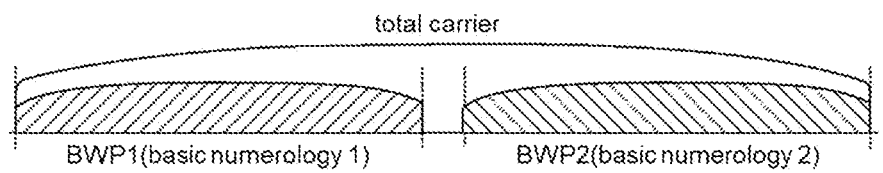

FIG. 3C

The network device sends first configuration information to the terminal device, and the terminal device receives the first configuration information sent by the network device. The first configuration information includes at least one SCG configuration, and each SCG configuration in the at least one SCG configuration includes configuration information of multiple cells, and at least one cell of the multiple cells is configured as a candidate PSCell. — 401

FIG. 4

CELL CONFIGURATION METHOD AND APPARATUS, TERMINAL DEVICE, AND NETWORK DEVICE

CROSS-REFERENCE TO RELATED APPLICATION

This application is a continuation of international PCT application serial no. PCT/CN2019/118555, filed on Nov. 14, 2019. The entirety of the above-mentioned patent application is hereby incorporated by reference herein and made a part of this specification.

BACKGROUND

Technical Field

The embodiments of the present disclosure relate to the field of mobile communication technologies, and in particular, to a cell configuration method and apparatus, a terminal device, and a network device.

Description of Related Art

When a secondary cell group (SCG) is configured through radio resource control (RRC) signaling, a primary secondary cell (PSCell) is configured in the RRC signaling. Currently, only one PSCell in the SCG is configured in the RRC signaling. When the PSCell needs to be changed, the RRC signaling is also required; on the other hand, when the PSCell needs to be changed, the random access procedure needs to be performed to obtain a tracking area (TA), which leads to an increase in the latency of changing the PSCell, and also leads to an increase in the latency of data interruption of the terminal device.

SUMMARY

Embodiments of the present disclosure provide a cell configuration method and apparatus, a terminal device, and a network device.

The cell configuration method provided by the embodiment of the present disclosure includes:

The terminal device receives first configuration information sent by the network device. The first configuration information includes at least one SCG configuration, and each SCG configuration in the at least one SCG configuration includes configuration information of multiple cells, and at least one cell of the multiple cells is configured as a candidate PSCell.

The cell configuration method provided by an embodiment of the present disclosure includes:

The network device sends first configuration information to the terminal device. The first configuration information includes at least one SCG configuration, and each SCG configuration in the at least one SCG configuration includes configuration information of multiple cells, and at least one cell of the multiple cells is configured as a candidate PSCell.

The cell configuration device provided in an embodiment of the present disclosure includes:

A receiving unit is configured to receive first configuration information sent by a network device. The first configuration information includes at least one SCG configuration, and each SCG configuration in the at least one SCG configuration includes configuration information of multiple cells, and at least one cell of the multiple cells is configured as a candidate PSCell.

The cell configuration device provided in an embodiment of the present disclosure includes:

A transmitting unit is configured to send first configuration information to the terminal device. The first configuration information includes at least one SCG configuration, and each SCG configuration in the at least one SCG configuration includes configuration information of multiple cells, and at least one cell of the multiple cells is configured as a candidate PSCell.

The terminal device provided by an embodiment of this disclosure includes a processor and a memory. The memory is used for storing a computer program, and the processor is used for invoking and executing the computer program stored in the memory to execute the above-mentioned cell configuration method.

A network device provided by an embodiment of this disclosure includes a processor and a memory. The memory is used for storing a computer program, and the processor is used for invoking and executing the computer program stored in the memory to execute the above-mentioned cell configuration method.

A chip provided in an embodiment of the present disclosure is used to implement the above cell configuration method.

Specifically, the chip includes: a processor for invoking and executing a computer program from the memory, so that the device installed with the chip executes the above-mentioned cell configuration method.

A computer-readable storage medium provided by an embodiment of the present disclosure is used to store a computer program, and the computer program enables a computer to execute the above-mentioned cell configuration method.

A computer program product provided by an embodiment of the present disclosure includes computer program instructions, and the computer program instructions enables a computer to execute the above-mentioned cell configuration method.

When the computer program provided by an embodiment of the present disclosure is executed on a computer, the computer is enabled to execute the above-mentioned cell configuration method.

Through the above technical solutions, a PSCell change mechanism based on L1 signaling and L2 signaling is introduced. On the other hand, execution of the random access procedure is avoided in the PSCell change procedure, so that the latency of changing the PSCell can be reduced, that is, the latency of data interruption of the terminal device can be reduced.

BRIEF DESCRIPTION OF THE DRAWINGS

The accompanying drawings described herein are used to facilitate further understanding of the disclosure and constitute a part of the disclosure. The schematic embodiments of the disclosure and their descriptions are used to explain the disclosure and do not constitute an improper limitation of the disclosure. In the attached image:

FIG. 3A is a schematic diagram 1 of the bandwidth part (BWP) provided by an embodiment of the disclosure.

FIG. 3B is a schematic diagram 2 of the BWP provided by an embodiment of the disclosure.

FIG. 3C is a schematic diagram 3 of the BWP provided by an embodiment of the disclosure.

FIG. 4 is a schematic flowchart of a cell configuration method provided by an embodiment of the disclosure.

DESCRIPTION OF THE EMBODIMENTS

The technical solutions in the embodiments of the disclosure will be described below with reference to the drawings in the embodiments of the disclosure. Clearly, the described embodiments are a part of the embodiments of the disclosure, but not all of the embodiments. Based on the embodiments in the disclosure, all other embodiments obtained by those of ordinary skill in the art without creative efforts shall fall within the protection scope of the disclosure.

The technical solutions of the embodiments of the disclosure can be applied to various communication systems, such as: Long Term Evolution (LTE) system, LTE Frequency Division Duplex (FDD) system, LTE Time Division Duplex (TDD) system, 5G communication system or future communication systems, etc.

Figure 1:
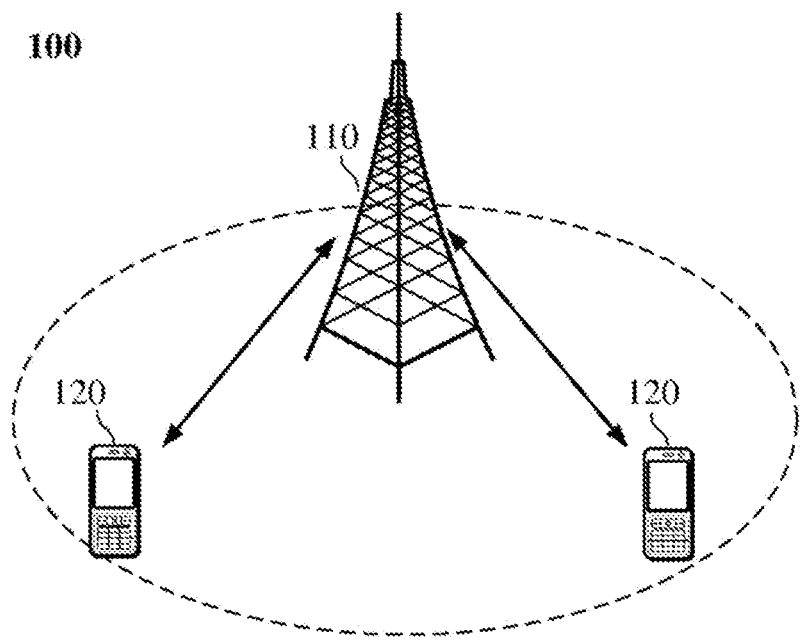
FIG. 1 is a schematic diagram of a communication system architecture provided by an embodiment of the disclosure.

Exemplarily, a communication system 100 to which the embodiments of the present disclosure are applied is shown in FIG. 1. The communication system 100 may include a network device 110, and the network device 110 may be a device that communicates with a terminal 120 (or referred to as a communication terminal, a terminal). The network device 110 may provide communication coverage for a specific geographic area, and may communicate with terminals located within the coverage area. Optionally, the network device 110 may be an evolutional node B, eNB or eNodeB in an LTE system, or a radio controller in a cloud radio access network (CRAN), or the network device can be a mobile switching center, a relay station, an access point, a vehicle-mounted device, a wearable device, a hub, a switch, a bridge, a router, a network-side device in a 5G network, or a network device in a future communication system.

The communication system 100 also includes at least one terminal 120 located within the coverage of the network device 110. "Terminal" as used herein includes, but is not limited to, connection via wireline, such as via Public Switched Telephone Networks (PSTN), Digital Subscriber Line (DSL), digital cable, direct cable connection; and/or another data connection/network; and/or via a wireless interface, e.g., for cellular networks, Wireless Local Area Networks (WLAN), digital television networks such as DVB-H networks, satellite networks, AM-FM broadcast transmitter; and/or an apparatus of another terminal configured to receive/transmit a communication signal; and/or an Internet of Things (IoT) device. A terminal arranged to communicate through a wireless interface may be referred to as a "wireless communication terminal", "wireless terminal" or "mobile terminal". Examples of mobile terminals include, but are not limited to, satellite or cellular telephones; Personal Communications System (PCS) terminals that may be combined with cellular radio telephones with data processing, facsimile, and data communications capabilities; may include radio telephones, pagers, Internet/Intranet with networking access, web browser, memo pad, calendar, and/or PDAs with Global Positioning System (GPS) receiver; and conventional laptop and/or palm-sized receivers or other electronic apparatuses including radiotelephone transceivers. A terminal may refer to an access terminal, user equipment (UE), subscriber unit, subscriber station, mobile station, mobile station, remote station, remote terminal, mobile device, user terminal, terminal, wireless communication device, user agent, or user device. The access terminal may be a cellular phone, a cordless phone, a Session Initiation Protocol (SIP) phone, a Wireless Local Loop (WLL) station, a Personal Digital Assistant (PDA), handheld devices with wireless communication function, computing devices or other processing devices connected to wireless modems, in-vehicle devices, wearable devices, terminals in 5G networks or terminals in future evolution PLMNs, etc.

Optionally, direct terminal (Device to Device, D2D) communication may be performed between the terminals 120.

Optionally, the 5G communication system or 5G network may also be referred to as a new radio (NR) system or an NR network.

FIG. 1 exemplarily shows one network device 110 and two terminals 120. Optionally, the communication system 100 may include multiple network devices 110 and the coverage of each network device 110 may include terminals 120 in different quantities. The embodiment of the disclosure is not limited thereto.

Optionally, the communication system 100 may further include other network entities such as a network controller and a mobility management entity, which are not limited in the embodiment of the present disclosure.

It should be understood that a device having a communication function in the network/system in the embodiment of the present disclosure may be referred to as a communication device. Taking the communication system 100 shown in FIG. 1 as an example, the communication device may include a network device 110 and a terminal 120 with communication functions, and the network device 110 and the terminal 120 may be the specific devices described above, and no repetition will not be incorporated here. The communication device may include other devices in the communication system 100, for example, other network entities such as a network controller and a mobility management entity, which are not limited in the embodiments of the present disclosure.

It should be understood that the terms "system" and "network" are often used interchangeably herein. The term "and/or" in this disclosure is only an association relationship to describe the associated objects, indicating that there can be three kinds of relationships, for example, A and/or B, it can mean that A exists alone, A and B exist simultaneously, and B exists alone. In addition, the character "/" in this disclosure generally indicates that the related objects are in an "or" relationship.

To facilitate understanding of the technical solutions of the embodiments of the disclosure, the following describes the technical solutions related to the embodiments of the disclosure.

With people's demand of high speed, low delay, high-speed mobility, and high energy and efficiency, and pursuit of diversity and complexity of services in future life, the 3rd Generation Partnership Project (3GPP) international standards organization began to develop 5G. The main application scenarios of 5G are: Enhanced Mobile Broadband (eMBB), Ultra-Reliable Low-Latency Communications (URLLC), Massive Machine-Type Communications (mMTC).

On the one hand, eMBB still focuses on users' access to multimedia content, services and data, and its demand is growing rapidly. On the other hand, since eMBB may be deployed in different scenarios, such as indoors, urban areas, rural areas, etc., its capabilities and requirements are also quite different, so it cannot be generalized and must be analyzed in detail in combination with specific deployment scenarios. Typical applications of URLLC include: industrial automation, power automation, telemedicine operations (surgery), traffic safety assurance, etc. Typical characteristics of mMTC include: high connection density, small amount of data, latency-insensitive services, low cost and long service life of module.

In the early deployment of NR, it is difficult to obtain complete NR coverage. As a result, typical network coverage is wide-area LTE coverage and NR island coverage mode. Moreover, a lot of LTE is deployed in sub-6 GHz, and there is very little sub-6 GHz spectrum available for 5G. Therefore, the study of the spectrum application above 6 GHz is required for NR, while the high frequency band has limited coverage and fast signal fading. In the meantime, in order to protect the early investment of mobile operators in LTE, a working mode of tight interworking between LTE and NR is proposed.

Figure 2:
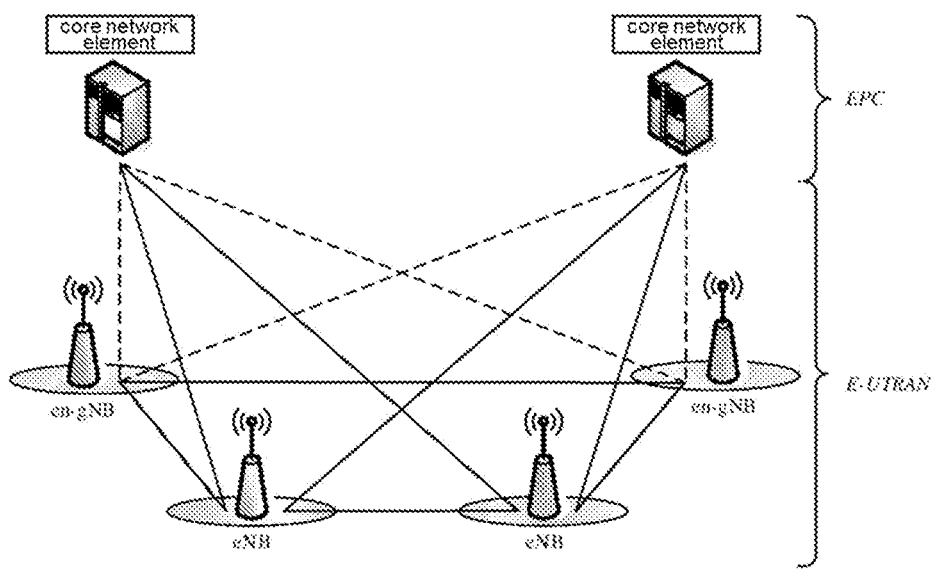
FIG. 2 is a network deployment and networking architecture diagram of an EN-DC provided by an embodiment of the disclosure.

3GPP completed the first version of 5G, that is, EN-DC (LTE-NR Dual Connectivity). In EN-DC, the LTE base station acts as a master node (MN), and the NR base station acts as a secondary node (SN). Specifically, MN is mainly responsible for RRC control function and the control plane leading to the core network (CN), and SN can be configured with auxiliary signaling, such as SRB3, which mainly provides a data transmission function. The network deployment and networking architecture of EN-DC is shown in FIG. 2. Specifically, the Evolved Universal Terrestrial Radio Access Network (E-UTRAN) represents the access network part, and the Evolved Packet Core Network (EPC) represents the core network part. The access network part consists of at least one eNB (two eNBs are illustrated in FIG. 2) and at least one en-gNB (two en-gNBs are illustrated in FIG. 2), in which the eNB acts as the MN, the en-gNB acts as the SN, and both the MN and the SN are connected to EPC.

In the later stage of R15, other Dual Connectivity (DC) modes will be supported, namely NE-DC, 5GC-EN-DC, NR DC, etc.

In 5G, the maximum channel bandwidth can be 400 MHZ (called wideband carrier), which has a very large bandwidth compared to LTE's maximum bandwidth of 20M. If the terminal device keeps working on the wideband carrier, the power consumption of the terminal device is very large. Therefore, it is recommended that the radio frequency (RF) bandwidth of the terminal device can be adjusted according to the actual throughput of the terminal device. Accordingly, the concept of bandwidth part (BWP) is introduced. The motivation of BWP is to optimize the power consumption of the terminal device. For example, if the speed of the terminal device is very low, a smaller BWP can be configured for the terminal device (as shown in FIG. 3A). If the speed requirement of the terminal device is high, a larger BWP BWP2 relative to the BWP BWP1 can be configured for the terminal device (as shown in FIG. 3B). If the terminal device supports high speed or works in carrier aggregation (CA) mode, multiple BWPs BWP1 and BWP2 may be configured for the terminal device (as shown in FIG. 3C). Another purpose of BWP is to trigger the coexistence of multiple basic numerology in a cell. As shown in FIG. 3C, BWP BWP1 corresponds to basic numerology 1, and BWP BWP2 corresponds to basic numerology 2.

A terminal device can be configured with up to 4 uplink BWPs and up to 4 downlink BWPs through a special signaling of Radio Resource Control (RRC), but only one uplink BWP and downlink BWP can be active at one time. In the RRC special signaling, the first active BWP (i.e., the initial active BWP) among the configured BWPs may be indicated. In the meantime, when the terminal device is in the connected state, it can also switch between different BWPs through downlink control information (DCI). When the carrier in the inactive state enters the active state, the first active BWP is the first active BWP configured in the RRC special signaling.

In the process of monitoring the Radio Link Monitor (RLM), the terminal device is only executed on the active BWP, and the inactive BWP does not need to be operated, and when switching between different BWPs, there is no need to reset RLM related timers and counters. For radio resource management (RRM) measurement, no matter which active BWP the terminal device sends and receives data on, the RRM measurement is not influenced. For channel quality indication (CQI) measurement, the terminal device also only needs to be executed on the active BWP.

When a carrier is deactivated and then active through the MAC CE, the initial first active BWP is the first active BWP configured in the RRC special signaling. The value of the BWP identifier (BWP id) in the RRC special signaling ranges from 0 to 4, and 0 is the BWP id of the initial BWP by default. In DCI, BWP indicator information is 2 bits. If the number of configured BWPs is less than or equal to 3, the BWP indicator=1, 2, and 3 correspond to BWP id=1, 2, and 3 respectively. If the number of BWPs is 4, the BWP indicator=0, 1, 2, and 3 correspond to the BWPs configured according to the sequential index respectively. Moreover, the network side uses continuous BWP id when configuring BWP.

When a Secondary Cell Group (SCG) is configured in RRC signaling, a Primary Secondary Cell (PSCell) will be configured in RRC signaling. The configuration information of the PSCell is shown in Table 1 below:

TABLE 1

| SpCellConfig ::= | SEQUENCE { | |
|---|---|---|
| servCellIndex | ServCellIndex | OPTIONAL, -- Cond SCG |
| reconfigurationWithSync ReconfWithSync | ReconfigurationWithSync | OPTIONAL, -- Cond |
| rlf-TimersAndConstants | SetupRelease { RLF-TimersAndConstants } | OPTIONAL, -- Need M |
| rlmInSyncOutOfSyncThreshold | ENUMERATED {n1} | OPTIONAL, --Need S |
| spCellConfigDedicated | ServingCellConfig | OPTIONAL, -- Need M |
| ... | | |

TABLE 1-continued

```
}
ReconfigurationWithSync ::=    SEQUENCE {
    spCellConfigCommon             ServingCellConfigCommon                    OPTIONAL,   -- Need M
    newUE-Identity                 RNTI-Value,
    t304                           ENUMERATED {ms50, ms100, ms150, ms200, ms500, ms1000, ms2000, ms10000},
    rach-ConfigDedicated           CHOICE {
        uplink                         RACH-ConfigDedicated,
        supplementaryUplink            RACH-ConfigDedicated
    }                                                                         OPTIONAL,   -- Need N
    ...,
    [[
    smtc                           SSB-MTC                                    OPTIONAL    -- Need S
    ]]
}
```

Optionally, when an SCG is configured in the RRC signaling, one or more secondary cells (SCell) are also configured in the RRC signaling. The configuration information of the SCell is shown in Table 2 below:

TABLE 2

```
SCellConfig ::=         SEQUENCE {
    SCellIndex              SCellIndex,
    SCellConfigCommon           ServingCellConfigCommon    OPTIONAL,   -- Cond
SCellAdd
    SCellConfigDedicated        ServingCellConfig          OPTIONAL,   -- Cond
SCellAddMod
    ...,
    [[
    smtc                        SSB-MTC                    OPTIONAL    -- Need S
    ]]
}
```

From the comparison of the configuration information of PSCell and SCell above, it can be seen that the unique configuration parameters in PSCell are:

Radio Link Failure (RLF) configuration parameter, because RLF is only shown on PSCell, not on SCell.

UE C-RNTI and T304, and the Cell Radio Network Temporary Identifier (C-RNTI) is a C-RNTI shared by all cells in the SCG. T304 is used for PSCell to change or add required mobility control parameters.

Special random access channel (RACH) resource, which needs to be used for uplink synchronization on PSCell.

Currently, only one PSCell in the SCG is configured in the RRC signaling. When the PSCell needs to be changed, the RRC signaling is also required. In order to reduce the latency and quickly change the PSCell, a PSCell change mechanism based on layer 1 (L1) signaling and layer 2 (L2) signaling needs to be introduced. Therefore, a set of PSCells (i.e., multiple candidate PSCells) needs to be configured in the RRC signaling. Meanwhile, when the PSCell is dynamically changed, it is not necessarily required to perform a random access procedure to obtain TA. For example, if the current PSCell and the target PSCell belong to the same TA group (TAG), the TA can remain unchanged. If the random access procedure is not performed to obtain the TA, the latency of changing the PSCell can be reduced, that is, the latency of data interruption of the terminal device can be reduced. The technical solution of the embodiment of the disclosure introduces a PSCell change mechanism based on L1 signaling and L2 signaling. On the other hand, execution of the random access procedure is avoided in the PSCell change procedure, so that the latency of changing the PSCell can be reduced, that is, the latency of data interruption of the terminal device can be reduced. The technical solutions of the embodiments of the disclosure will be described in detail below.

FIG. 4 is a schematic flowchart of a cell configuration method provided by an embodiment of the present disclosure. As shown in FIG. 4, the cell configuration method includes the following steps:

Step 401: The network device sends first configuration information to the terminal device, and the terminal device receives the first configuration information sent by the network device. The first configuration information includes at least one SCG configuration, and each SCG configuration in the at least one SCG configuration includes configuration information of multiple cells, and at least one cell of the multiple cells is configured as a candidate PSCell.

In an embodiment of the disclosure, the network device may be a base station, such as a gNB.

In an optional embodiment, the configuration information of each cell in the multiple cells carries first indication information. The first indication information is used to indicate whether the corresponding cell is a candidate PSCell. Further, optionally, the configuration information of the cell further carries second indication information. The second indication information is used to indicate whether the corresponding cell is a candidate PSCell in an active state.

Here, referring to Table 3 below, when configuring the candidate PSCell, the network side may use one bit (i.e., the first indication information) to indicate whether the currently configured cell is the candidate PSCell. Similarly, a bit (i.e., the second indication information) may also be used to indicate whether the currently configured candidate PSCell is an active candidate PSCell (i.e., whether the candidate PSCell is in an active state).

TABLE 3

```
SCellConfig ::=         SEQUENCE {
    sCellIndex              SCellIndex,
    sCellConfigCommon           ServingCellConfigCommon    OPTIONAL, --
Cond SCellAdd
    sCellConfigDedicated    ServingCellConfig          OPTIONAL,  -- Cond
SCellAddMod
    ...,
    [[
    smtc                SSB-MTC                    OPTIONAL   -- Need
S
    ]],
    [[candidatePScell      boolean    optional]]
}
```

Based on this, if the first indication information indicates that the corresponding cell is a candidate PSCell, and the second indication information indicates that the corresponding cell is an active PSCell, the cell is configured as a PSCell in the SCG to which it belongs. If the first indication information indicates that the corresponding cell is not a candidate PSCell or the second indication information indicates that the corresponding cell is not an active candidate PSCell, the cell is configured as an SCell in the SCG.

It should be noted that there is only one cell in the SCG that can be used as PSCell, and other cells are used as SCell.

In an optional embodiment, the first configuration information is carried in RRC signaling. When configuring the SCG in the RRC signaling, each SCG is configured with at least one candidate PSCell, for example, N candidate PSCells are configured, and N is a positive integer. The RRC signaling may configure which candidate PSCell is the currently active candidate PSCell among the N candidate PSCells, and the inactive candidate PSCell is used as the SCell.

In an optional embodiment, the SCG configuration further includes common configuration information for all PSCells. If the first cell in the multiple cells is a PSCell in the SCG, the configuration information of the PSCell includes the common configuration information and configuration information of the first cell.

Here, the common configuration information includes at least one of the following: an RLF configuration parameter, a C-RNTI of the terminal device, and T304. The T304 is used to instruct the terminal device to perform a time threshold for PSCell change or addition. The RLF configuration parameters are shown in Table 4 below, and the C-RNTI and T304 of the terminal device are shown in Table 5 below.

TABLE 4

| rlf-TimersAndConstants TimersAndConstants } | SetupRelease { RLF-OPTIONAL, -- Need M |
|---|---|
| rlmInSyncOutOfSyncThreshold OPTIONAL, -- Need S | ENUMERATED {n1} |

TABLE 5

| newUE-Identity | RNTI-Value, |
|---|---|
| t304 | ENUMERATED {ms50, ms100, ms150, ms200, ms500, ms1000, ms2000, ms10000}, |

It should be noted that the above public configuration information is configured with SCG as the granularity. When any cell is used as a PSCell, its own configuration information and the above common configuration information can be combined to form the configuration information of PSCell.

The technical solution in the embodiment of the disclosure also provides a PSCell change mechanism. Specifically, the terminal device sends a measurement report to the network device, and the measurement report is used by the network device to determine whether to change the PSCell.

In an optional embodiment, the first cell and the second cell belong to the same SCG, the first cell is the current PSCell of the SCG, the second cell is the target PSCell of the SCG to be changed, and the target PSCell is a candidate PSCell or SCell in the SCG. It should be noted that the PSCell change is limited to the cell change within the SCG, that is, the change from the current PScell to a certain candidate PScell, or any Scell.

If the network device determines that the PSCell needs to be changed, the network device sends a PSCell change command to the terminal device, and the terminal device receives the PSCell change command sent by the network device. The PSCell change command includes at least one of the following information:

Cell identity information of the target PSCell;
Indication information of whether the random access procedure needs to be performed;
Configuration information of special RACH resources;
Downlink (DL) grant information of the target PSCell;
Uplink (UL) grant information of the target PSCell;
The indication information of the identification of the bandwidth part (BWP), the indication information of the BWP identification is used to indicate the active BWP of the terminal device on the target PSCell;
T304, the T304 is used to instruct the terminal device to execute the time threshold for PSCell change or addition;
RLF configuration parameters;
Indication information of whether the RLF configuration parameters are changed;
TA offset, the TA offset is used for the terminal device to update the TA;
Configuration information of signaling radio bearer (SRB).

In the above solution, the cell identity information of the target PSCell includes at least one of the following: Physical Cell Identity (PCI), frequency, Cell Global Identifier (CGI), serving cell index, and cell index information.

For example, the cell identification information of the target PSCell is PCI+frequency, or NR cell global identifier (N-CGI), or serving cell index, or index information of candidate PSCells.

In the above solution, the configuration information of the special RACH resource includes at least one of the following: configuration information of a special preamble and configuration information of a special RACH occasion.

In the above solution, the configuration information of the SRB includes at least one of the following: configuration information of SRB3, configuration information of split SRB1, and configuration information of split SRB2.

The configuration information of the SRB is determined based on the configuration information of the first cell (i.e., the current PSCcell), or based on the default configuration information, or determined based on the configuration information of the second cell (i.e., the target PSCell).

Optionally, the network side may configure the configuration information of SRB3 and/or split SRB1 and SRB2 when configuring the candidate PSCell.

In the above solution, the PSCell change command is carried in RRC signaling or a physical downlink control channel (PDCCH) or a media access control control element (MAC CE).

The above technical solutions of the embodiments of the disclosure implement a PScell change mechanism based on L1 and L2 signaling.

In an optional embodiment, the first cell and the second cell belong to the same TAG, the first cell is the current PSCell of the SCG, and the second cell is the target PSCell of the SCG to be changed.

Here, when the PScell is changed within the same TAG, under the circumstances, since all cells in one TAG share the same TA, the random access procedure is re-executed without updating the TA at this time.

Based on the above, the network device sends a PSCell change command to the terminal device, and the terminal device receives the PSCell change command sent by the network device. The PSCell change command carries third indication information, and the third indication information is used to instruct whether to update the TA.

1) If the third indication information indicates to update the TA, the PSCell change command includes configuration information of special RACH resources, and the terminal device performs a random access procedure based on the special RACH resources.

Here, if the TA needs to be updated, the network side will configure special RACH resources for the terminal device to perform the random access procedure.

2) If the third indication information indicates that the TA is not to be updated, the terminal device does not perform the random access procedure and changes the cell where the RRC entity is located.

Here, if the TA does not need to be updated, the network side does not need to configure special RACH resources, and the terminal device does not need to perform a random access procedure. After receiving the PSCell change command, the terminal device changes the cell where the RRC entity is located.

Optionally, the PSCell change command includes DL grant information and/or UL grant information of the target PSCell. That is, the network side can configure scheduling information (such as DL grant information and/or UL grant information) for the terminal device to send and receive data.

In the above solution, the PSCell change command is carried in RRC signaling or PDCCH or MAC CE.

The above technical solution of the embodiment of the disclosure avoids the random access procedure when PSCell change.

In an optional embodiment, the PSCell change command is used to trigger PSCell change for one or more SCGs.

It should be noted that when multiple SCGs are configured on the network side, the network side can indicate the activation state of each SCG, that is, multiple SCGs can be active simultaneously. Further, the network side can simultaneously perform PSCell changes of multiple SCGs through one network command. The following describes how to change the PSCell of multiple SCGs.

Change method 1: The PSCell change command carries a first bitmap, each bit in the first bitmap corresponds to one SCG, and the value of the bit is used to indicate whether the PSCell of the SCG corresponding to the bit needs to be changed. For example, a value of 1 (or 0) for a bit indicates that the SCG corresponding to this bit undergoes PSCell change; a value of 0 (or 1) for a bit indicates that the SCG corresponding to this bit does not undergo PSCell change.

Further, the PSCell change command further carries a first cell list (cell list). The first cell list is used to indicate cell identification information of the target PSCell corresponding to one or more SCGs for which the PSCell that need to be changed. Here, the cell identification information of the target PSCell includes at least one of the following: PCI, frequency, CGI, serving cell index, and cell index information. For example, the cell identification information of the target PSCell is PCI+frequency, or N-CGI, or serving cell index, or index information of candidate PSCells.

Change method 2: The PSCell change command carries fourth indication information, where the fourth indication information is used to indicate the SCG group for which the PSCell needs to be changed, and the SCG group includes multiple SCGs.

Here, the network side may configure one or more SCGs as an SCG group through RRC signaling, that is, multiple SCGs are configured in groups. Further, the network side carries the indication information (i.e., the fourth indication information) of whether each SCG group needs to perform PSCell change in the PSCell change command.

Further, the PSCell change command further carries a first cell list. The first cell list is used to indicate the cell identification information of the target PSCell corresponding to one or more SCGs for which the PSCell need to be changed. Here, the cell identification information of the target PSCell includes at least one of the following: PCI, frequency, CGI, serving cell index, and cell index information. For example, the cell identification information of the target PSCell is PCI+frequency, or N-CGI, or serving cell index, or index information of candidate PSCells.

In the above solution, the PSCell change command is carried in RRC signaling or PDCCH or MAC CE.

The above technical solution of the embodiment of the disclosure realizes that the PSCell of multiple SCGs is changed simultaneously.

Figure 5:
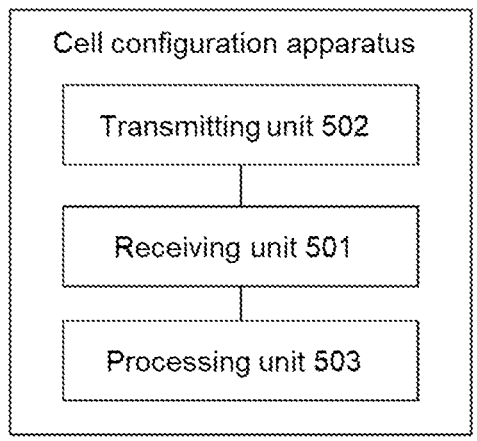
FIG. 5 is a first schematic diagram of the structural construction of a cell configuration apparatus provided by an embodiment of the present disclosure.

FIG. 5 is a first schematic diagram of the structural construction of a cell configuration apparatus provided by an embodiment of the present disclosure, which is applied to a terminal device. As shown in FIG. 5, the cell configuration apparatus includes:

A receiving unit 501 is configured to receive first configuration information sent by a network device. The first configuration information includes at least one SCG configuration, and each SCG configuration in the at least one SCG configuration includes configuration information of multiple cells, and at least one cell of the multiple cells is configured as a candidate PSCell.

In an optional embodiment, the configuration information of each cell in the multiple cells carries first indication information, and the first indication information is used to indicate whether the corresponding cell is a candidate PSCell.

In an optional embodiment, the configuration information of the cell further carries second indication information, and the second indication information is used to indicate whether the corresponding cell is a candidate PSCell in an active state.

In an optional embodiment, if the first indication information indicates that the corresponding cell is a candidate PSCell, and the second indication information indicates that the corresponding cell is an active PSCell, the cell is configured to belong to PSCell in SCG.

If the first indication information indicates that the corresponding cell is not a candidate PSCell or the second indication information indicates that the corresponding cell is not an active candidate PSCell, the cell is configured as an SCell in the SCG.

In an optional embodiment, the SCG configuration further includes common configuration information for all PSCells.

If the first cell in the multiple cells is a PSCell in the SCG, the configuration information of the PSCell includes the common configuration information and the configuration information of the first cell.

In an optional embodiment, the common configuration information includes at least one of the following: RLF configuration parameters, C-RNTI of the terminal device, and T304. The T304 is used to instruct the terminal device to perform a time threshold for PSCell change or addition.

In an optional embodiment, the device further includes:

A transmitting unit 502 is configured to send a measurement report to the network device, and the measurement report is used by the network device to determine whether to change the PSCell. The change of PSCell refers to changing the PSCell of the SCG from the first cell to the second cell.

In an optional embodiment, the first cell and the second cell belong to the same SCG, the first cell is the current PSCell of the SCG, the second cell is the target PSCell of the SCG to be changed, and the target PSCell is a candidate PSCell or SCell in the SCG.

In an optional embodiment, the receiving unit 501 is further configured to receive a PSCell change command sent by the network device, and the PSCell change command includes at least one of the following information:
Cell identity information of the target PSCell;
Indication information of whether the random access procedure needs to be performed;
Configuration information of special RACH resources;
Downlink (DL) grant information of the target PSCell;
Uplink (UL) grant information of the target PSCell;
The indication information of the BWP identification, the indication information of the BWP identification is used to indicate the active BWP of the terminal device on the target PSCell;
T304, the T304 is used to instruct the terminal device to execute the time threshold for PSCell change or addition;
RLF configuration parameters;
Indication information of whether the RLF configuration parameters are changed;
TA offset, the TA offset is used for the terminal device to update the TA;
Configuration information of signaling radio bearer (SRB).

In an optional embodiment, the cell identification information of the target PSCell includes at least one of the following: PCI, frequency, CGI, serving cell index, and cell index information.

In an optional embodiment, the configuration information of the special RACH resource includes at least one of the following: configuration information of a special preamble and configuration information of a special RACH occasion.

In an optional embodiment, the configuration information of the SRB includes at least one of the following: configuration information of SRB3, configuration information of split SRB1, and configuration information of split SRB2.

The configuration information of the SRB is determined based on the configuration information of the first cell, or determined based on the default configuration information, or determined based on the configuration information of the second cell.

In an optional embodiment, the first cell and the second cell belong to the same TAG, the first cell is the current PSCell of the SCG, and the second cell is the target PSCell of the SCG to be changed.

In an optional embodiment, the receiving unit 501 is further configured to receive a PSCell change command sent by the network device, and the PSCell change command carries third indication information, and the third indication information is used to instruct whether to update TA.

In an optional embodiment, the device further includes:
A processing unit 503 is configured to, if the third indication information indicates to update the TA, the PSCell change command includes configuration information of special RACH resources, and a random access procedure is performed based on the special RACH resources.

In an optional embodiment, the device further includes:
A processing unit 503 is configured to not perform the random access procedure and change the cell where the RRC entity is located if the third indication information indicates that the TA is not to be updated.

In an optional embodiment, the PSCell change command includes DL grant information and/or UL grant information of the target PSCell.

In an optional embodiment, the PSCell change command is used to trigger PSCell change for one or more SCGs.

In an optional embodiment, the PSCell change command carries a first bitmap, each bit in the first bitmap corresponds to an SCG, and the value of the bit is used to indicate whether the PSCell needs to be changed for the SCG corresponding to the bit.

In an optional embodiment, the PSCell change command carries fourth indication information, and the fourth indication information is used to indicate the SCG group for which the PSCell needs to be changed, and the SCG group includes multiple SCGs.

In an optional embodiment, the PSCell change command further carries a first cell list, and the first cell list is used to indicate cell identification information of the target PSCell corresponding to one or more SCGs for which the PSCell needs to be changed.

In an optional embodiment, the cell identification information of the target PSCell includes at least one of the following: PCI, frequency, CGI, serving cell index, and cell index information.

In an optional embodiment, the PSCell change command is carried in RRC signaling or PDCCH or MAC CE.

Those skilled in the art should understand that the relevant description of the above-mentioned cell configuration apparatus in the embodiment of the present disclosure can be understood with reference to the relevant description of the cell configuration method in the embodiment of the present disclosure.

Figure 6:
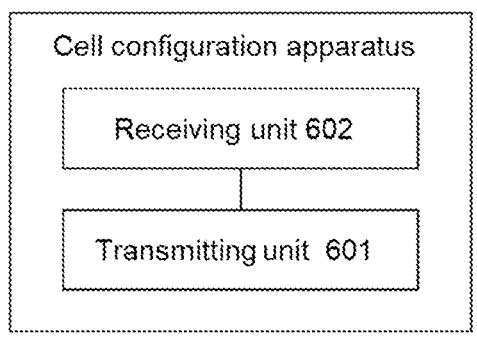
FIG. 6 is a second schematic diagram of the structural construction of a cell configuration apparatus provided by an embodiment of the present disclosure.

FIG. 6 is a second schematic diagram of the structural construction of a cell configuration apparatus provided by an embodiment of the present disclosure, which is applied to a network device. As shown in FIG. 6, the cell configuration apparatus includes:

A transmitting unit 601 is configured to send first configuration information to a terminal device, and the first configuration information includes at least one SCG configuration, and each SCG configuration in the at least one SCG configuration includes configuration information of multiple cells, and at least one cell among the multiple cells is configured as a candidate PSCell.

In an optional embodiment, the configuration information of each cell in the multiple cells carries first indication information, and the first indication information is used to indicate whether the corresponding cell is a candidate PSCell.

In an optional embodiment, the configuration information of the cell further carries second indication information, and the second indication information is used to indicate whether the corresponding cell is a candidate PSCell in an active state.

In an optional embodiment, if the first indication information indicates that the corresponding cell is a candidate PSCell, and the second indication information indicates that the corresponding cell is an active PSCell, the cell is configured to belong to PSCell in SCG.

If the first indication information indicates that the corresponding cell is not a candidate PSCell or the second indication information indicates that the corresponding cell is not an active candidate PSCell, the cell is configured as an SCell in the SCG.

In an optional embodiment, the SCG configuration further includes common configuration information for all PSCells.

If the first cell in the multiple cells is a PSCell in the SCG, the configuration information of the PSCell includes the common configuration information and the configuration information of the first cell.

In an optional embodiment, the common configuration information includes at least one of the following: RLF configuration parameters, C-RNTI of the terminal device, and T304, and the T304 is used to instruct the terminal device to perform a time threshold for PSCell change or addition.

In an optional embodiment, the device further includes:

A receiving unit 602 is configured to receive a measurement report sent by the terminal device, and the measurement report is used by the network device to determine whether to change the PSCell. The change of PSCell refers to changing the PSCell of the SCG from the first cell to the second cell.

In an optional embodiment, the first cell and the second cell belong to the same SCG, the first cell is the current PSCell of the SCG, the second cell is the target PSCell of the SCG to be changed, and the target PSCell is a candidate PSCell or SCell in the SCG.

In an optional embodiment, the transmitting unit 601 is further configured to send a PSCell change command to the terminal device, and the PSCell change command includes at least one of the following information:

Cell identity information of the target PSCell;
Indication information of whether the random access procedure needs to be performed;
Configuration information of special RACH resources;
Downlink (DL) grant information of the target PSCell;
Uplink (UL) grant information of the target PSCell;
The indication information of the BWP identification, the indication information of the BWP identification is used to indicate the active BWP of the terminal device on the target PSCell;
T304, the T304 is used to instruct the terminal device to execute the time threshold for PSCell change or addition;
RLF configuration parameters;
Indication information of whether the RLF configuration parameters are changed;
TA offset, the TA offset is used for the terminal device to update the TA;
Configuration information of signaling radio bearer (SRB).

In an optional embodiment, the cell identification information of the target PSCell includes at least one of the following: PCI, frequency, CGI, serving cell index, and cell index information.

In an optional embodiment, the configuration information of the special RACH resource includes at least one of the following: configuration information of a special preamble and configuration information of a special RACH occasion.

In an optional embodiment, the configuration information of the SRB includes at least one of the following: configuration information of SRB3, configuration information of split SRB1, and configuration information of split SRB2.

The configuration information of the SRB is determined based on the configuration information of the first cell, or determined based on the default configuration information, or determined based on the configuration information of the second cell.

In an optional embodiment, the first cell and the second cell belong to the same TAG, the first cell is the current PSCell of the SCG, and the second cell is the target PSCell of the SCG to be changed.

In an optional embodiment, the transmitting unit 601 is further configured to send a PSCell change command to the terminal device, and the PSCell change command carries third indication information, and the third indication information is used to instruct whether to update the TA.

In an optional embodiment, if the third indication information indicates to update the TA, the PSCell change command includes configuration information of special RACH resources, and the configuration information of the special RACH resources is used for the terminal device to perform the random access procedure.

In an optional embodiment, if the third indication information indicates that the TA is not to be updated, the PSCell change command includes DL grant information and/or UL grant information of the target PSCell.

In an optional embodiment, the PSCell change command is used to trigger PSCell change for one or more SCGs.

In an optional embodiment, the PSCell change command carries a first bitmap, each bit in the first bitmap corresponds to one SCG, and the value of the bit is used to indicate whether the PSCell for the SCG corresponding to the bit needs to be changed.

In an optional embodiment, the PSCell change command carries fourth indication information, and the fourth indication information is used to indicate the SCG group for which the PSCell needs to be changed, and the SCG group includes multiple SCGs.

In an optional embodiment, the PSCell change command further carries a first cell list, and the first cell list is used to indicate cell identification information of the target PSCell corresponding to one or more SCGs for which the PSCell needs to be changed.

In an optional embodiment, the cell identification information of the target PSCell includes at least one of the following: PCI, frequency, CGI, serving cell index, and cell index information.

In an optional embodiment, the PSCell change command is carried in RRC signaling or PDCCH or MAC CE.

Those skilled in the art should understand that the relevant description of the above-mentioned cell configuration apparatus in the embodiment of the present disclosure can be understood with reference to the relevant description of the cell configuration method in the embodiment of the present disclosure.

Figure 7:
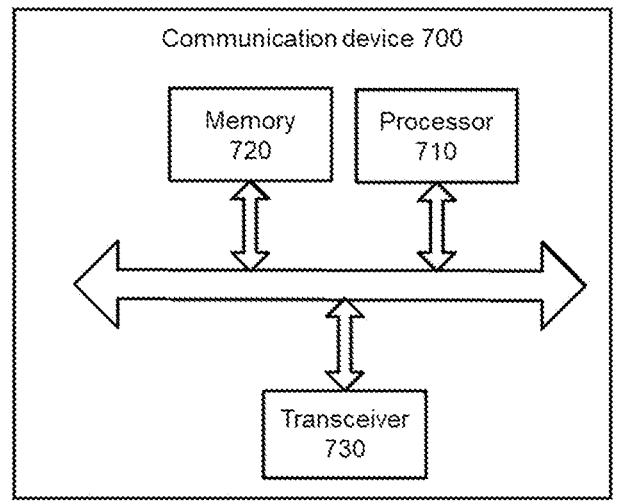
FIG. 7 is a schematic structural diagram of a communication device provided by an embodiment of the disclosure.

FIG. 7 is a schematic structural diagram of a communication device 700 provided in an embodiment of the present disclosure. The communication device may be a terminal device or a network device. The communication device 700 shown in FIG. 7 includes a processor 710, and the processor 710 can invoke and execute a computer program from a memory to implement the method in the embodiment of the disclosure.

Optionally, as shown in FIG. 7, the communication device 700 may further include a memory 720. The processor 710 may invoke and execute a computer program from the memory 720 to implement the method in the embodiment of the present disclosure.

The memory 720 may be a separate device independent of the processor 710, or may be integrated in the processor 710.

Optionally, as shown in FIG. 7, the communication device 700 may further include a transceiver 730, and the processor 710 may control the transceiver 730 to communicate with other devices, specifically, to send information or data to other devices, or receive information or data sent by other devices.

Specifically, the transceiver 730 may include a transmitter and a receiver. The transceiver 730 may further include antennas, and the number of the antennas may be one or more.

Optionally, the communication device 700 may specifically be the network device of the embodiment of the disclosure, and the communication device 700 may implement the corresponding processes implemented by the network device in various methods of the embodiment of the disclosure. For conciseness, no repetition is incorporated herein.

Optionally, the communication device 700 may specifically be a mobile terminal/terminal device of the embodiment of the present disclosure, and the communication device 700 may implement the corresponding processes implemented by the mobile terminal/terminal device in various methods of the embodiment of the present disclosure. For conciseness, no repetition is incorporated herein.

Figure 8:
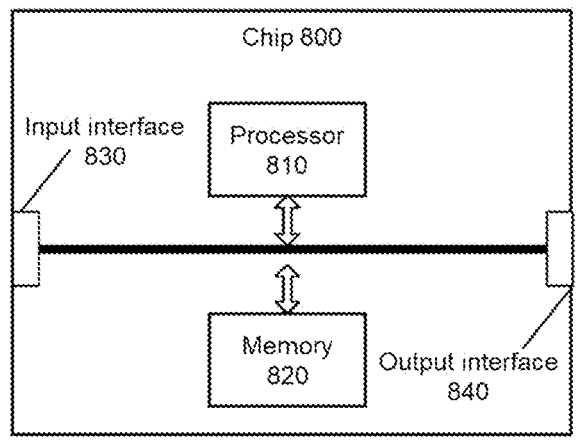
FIG. 8 is a schematic structural diagram of a chip according to an embodiment of the disclosure.

FIG. 8 is a schematic structural diagram of a chip according to an embodiment of the disclosure. The chip 800 shown in FIG. 8 includes a processor 810, and the processor 810 can invoke and execute a computer program from a memory to implement the method in the embodiment of the present disclosure.

Optionally, as shown in FIG. 8, the chip 800 may further include a memory 820. The processor 810 can invoke and execute a computer program from the memory 820 to implement the method in the embodiment of the present disclosure.

The memory 820 may be a separate device independent of the processor 810, or may be integrated in the processor 810.

Optionally, the chip 800 may further include an input interface 830. The processor 810 may control the input interface 830 to communicate with other devices or chips, and specifically, to acquire information or data sent by other devices or chips.

Optionally, the chip 800 may further include an output interface 840. The processor 810 may control the output interface 840 to communicate with other devices or chips, and specifically, to output information or data to other devices or chips.

Optionally, the chip 800 can be applied to the network device in the embodiment of the disclosure, and the chip 800 can implement the corresponding processes implemented by the network device in various methods of the embodiment of the disclosure. For conciseness, no repetition is incorporated herein.

Optionally, the chip 800 can be applied to the mobile terminal/terminal device in the embodiment of the disclosure, and the chip 800 can implement the corresponding processes implemented by the mobile terminal/terminal device in various methods of the embodiment of the disclosure. For conciseness, no repetition is incorporated herein.

It should be understood that the chip mentioned in the embodiments of the present disclosure may also be referred to as a system-on-chip, or the like.

Figure 9:
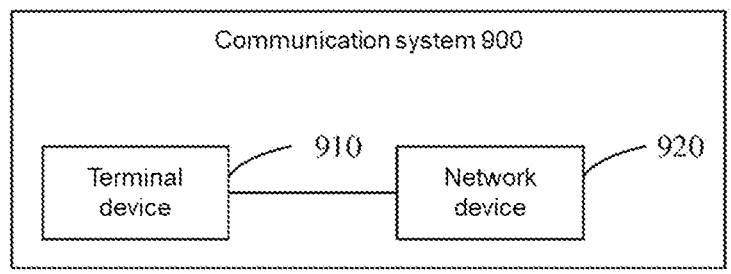
FIG. 9 is a schematic block diagram of a communication system provided by an embodiment of the present disclosure.

FIG. 9 is a schematic block diagram of a communication system 900 provided in an embodiment of the present disclosure. As shown in FIG. 9, the communication system 900 includes a terminal device 910 and a network device 920.

The terminal device 910 can be used to implement the corresponding functions implemented by the terminal device in the above method, and the network device 920 can be used to implement the corresponding functions implemented by the network device in the above method. For conciseness, details are not repeated here.

It should be understood that the processor of the embodiment of the present disclosure may be an integrated circuit chip, which has signal processing capability. In the implementation process, each step of the above method embodiments may be completed by a hardware integrated logic circuit in a processor or an instruction in the form of software. The above-mentioned processor may be a general-purpose processor, a digital signal processor (DSP), an application specific integrated circuit (ASIC), a field programmable gate array (FPGA) or other programmable logic devices, discrete gate or transistor logic devices, and discrete hardware components, which can implement or perform the methods, steps and logical block diagrams disclosed in the embodiments of the present disclosure. A general purpose processor may be a microprocessor or the processor may be any conventional processor or the like. The steps of the method disclosed in conjunction with the embodiments of the present disclosure may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media that are mature in the art. The storage medium is located in the memory, and the processor reads the information in the memory, and completes the steps of the above method in combination with its hardware.

It can be understood that the memory in the embodiments of the disclosure may be either volatile memory or non-volatile memory, or may include both volatile and non-volatile memory. Specifically, the non-volatile memory may be a read-only memory (ROM), a programmable ROM (PROM), an erasable PROM (EPROM), an electrically EPROM (EEPROM) or flash memory. Volatile memory may be random access memory (RAM), which acts as an external cache. By way of example and not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM)) and direct rambus RAM (DR RAM). It should be noted that the memory of the systems and methods described herein is intended to include, but not be limited to, these and any other suitable types of memory.

It should be understood that the above-mentioned memory is described in an exemplary but not a limitative description, for example, the memory in the embodiment of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct rambus RAM (DR RAM) and so on. That is, the memory in embodiments of the disclosure is intended to include, but not be limited to, these and any other suitable types of memory.

An embodiment of the disclosure further provides a computer-readable storage medium for storing a computer program.

Optionally, the computer-readable storage medium can be applied to the network device in the embodiment of the present disclosure, and the computer program enables the computer to execute the corresponding process implemented by the network device in various methods of the embodiment of the present disclosure. For conciseness, details are not repeated here.

Optionally, the computer-readable storage medium can be applied to the mobile terminal/terminal device in the embodiment of the present disclosure, and the computer program enables the computer to execute the corresponding processes implemented by the mobile terminal/terminal device in various methods of the embodiment of the present disclosure. For conciseness, details are not repeated here.

An embodiment of the disclosure further provides a computer program product comprising computer program instructions.

Optionally, the computer program product can be applied to the network device in the embodiment of the present disclosure, and the computer program instructions enable the computer to execute the corresponding processes implemented by the network device in various methods of the embodiment of the present disclosure. For conciseness, details are not repeated here.

Optionally, the computer program product can be applied to the mobile terminal/terminal device in the embodiment of the present disclosure, and the computer program instructions enable the computer to execute the corresponding process implemented by the mobile terminal/terminal device in various methods of the embodiment of the present disclosure. For conciseness, details are not repeated here.

An embodiment of the disclosure further provides a computer program.

Optionally, the computer program can be applied to the network device in the embodiment of the present disclosure, and when the computer program is executed on the computer, the computer is enabled to execute the corresponding processes implemented by the network device in various methods of the embodiment of the present disclosure. For conciseness, details are not repeated here.

Optionally, the computer program can be applied to the mobile terminal/terminal device in the embodiment of the present disclosure, and when the computer program is executed on the computer, the computer is enabled to execute the corresponding processes implemented by the mobile terminal/terminal device in various methods of the embodiment of the present disclosure. For conciseness, details are not repeated here.

Those of ordinary skill in the art can realize that the units and algorithm steps of various examples described in conjunction with the embodiments disclosed herein can be implemented in the form of electronic hardware, or a combination of computer software and electronic hardware. Whether these functions are performed in the form of hardware or software depends on the specific application and design conditions of the technical solution. Those skilled in the art may use different methods of implementing the described functionality for each particular application, but such implementations should not be considered beyond the scope of the disclosure.

Those skilled in the art can clearly understand that, for the convenience and brevity of description, the specific operation process of the system, device and unit described above may refer to the corresponding process in the foregoing method embodiments, and details are not repeated here.

In the several embodiments provided by the disclosure, it should be understood that the disclosed system, apparatus and method may be implemented in other manners. For example, the apparatus embodiments described above are only illustrative. For example, the division of the units is only a logical function division. In actual implementation, there may be other division methods. For example, multiple units or components may be combined or can be integrated into another system, or some features can be ignored, or not implemented. On the other hand, the shown or discussed mutual coupling or direct coupling or communication connection may be established through indirect coupling or communication connection of some interfaces, devices or units in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

In addition, various functional units in various embodiments of the present disclosure may be integrated into one processing unit, or various units may exist physically alone, or two or more units may be integrated into one unit.

The functions, if implemented in the form of software functional units and sold or used as independent products, may be stored in a computer-readable storage medium. Based on such understanding, the technical solution of the disclosure can be embodied in the form of a software product in essence, or the part that contributes to the prior art or the part of the technical solution. The computer software product is stored in a storage medium, including several instructions that are used to enable a computer device (which may be a personal computer, a server, or a network device, etc.) to perform all or part of the steps of the methods described in the various embodiments of the disclosure. The aforementioned storage medium includes: U disk, mobile hard disk, ROM, RAM, magnetic disk or optical disk and other media that can store program codes.

The above are only specific implementations of the disclosure, but the scope to be protected by the disclosure is not limited thereto. Any person skilled in the art can easily think of changes or substitutions within the technical scope disclosed by the disclosure, and the changes or substitutions should be covered within the scope to be protected by the disclosure. Therefore, the scope to be protected by the disclosure shall be subjected to the scope of the claims.

What is claimed is:

1. A cell configuration method, comprising:
receiving, a terminal device, first configuration information sent by a network device, wherein the first configuration information comprises at least one secondary cell group (SCG) configuration, and each SCG configuration in the at least one SCG configuration comprises configuration information of a plurality of cells, and at least one cell of the plurality of cells is configured as a candidate primary secondary cell (PSCell);
sending, by the terminal device, a measurement report to the network device, and the measurement report being used by the network device to determine whether to change the PSCell; wherein the change of the PSCell refers to changing the PSCell of the SCG from the first cell to a second cell; and
receiving, by the terminal device, a PSCell change command sent by the network device, wherein the PSCell change command carries third indication information, and the third indication information is used to instruct whether to update a tracking area (TA).

2. The cell configuration method according to claim 1, wherein the configuration information of the each cell in the plurality of cells carries first indication information, and the first indication information is used to indicate whether the corresponding cell is the candidate PSCell.

3. The cell configuration method according to claim 2, wherein the configuration information of the cell further carries second indication information, and the second indication information is used to indicate whether the corresponding cell is a candidate PSCell in an active state.

4. The cell configuration method according to claim 1, wherein the first cell and the second cell belong to the same SCG, the first cell is the current PSCell of the SCG, the second cell is a target PSCell of the SCG to be changed, and the target PSCell is the candidate PSCell or the SCell in the SCG.

5. The cell configuration method according to claim 1, wherein the method further comprises:
receiving, by the terminal device, a PSCell change command sent by the network device, and the PSCell change command comprising at least one of the following:
cell identity information of the target PSCell;
indication information of whether a random access procedure needs to be performed;
configuration information of special random access channel (RACH) resources;
downlink (DL) grant information of the target PSCell;
uplink (UL) grant information of the target PSCell;
indication information of identification of a bandwidth part (BWP), wherein the indication information of the BWP identification is used to indicate an active BWP of the terminal device on the target PSCell;
the T304, wherein the T304 is used to instruct the terminal device to execute the time threshold for PSCell change or addition;
RLF configuration parameters;
indication information of whether the RLF configuration parameters are changed;
a tracking area (TA) offset, wherein the TA offset is used for the terminal device to update the TA;
configuration information of signaling radio bearer (SRB).

6. The cell configuration method according to claim 1, wherein the method further comprises:
if the third indication information indicates to update the TA, the PSCell change command comprises configuration information of special RACH resources, and the terminal device performs a random access procedure based on the special RACH resources.

7. The cell configuration method according to claim 1, wherein the method further comprises:
if the third indication information indicates that the TA is not to be updated, the terminal device does not perform a random access procedure and changes a cell where a radio resource control (RRC) entity is located.

8. The cell configuration method according to claim 5, wherein the PSCell change command is used to trigger a PSCell change for one or more SCGs.

9. A cell configuration method, comprising:
sending, by a network device, first configuration information to a terminal device, wherein the first configuration information comprises at least one secondary cell group (SCG) configuration, and each SCG configuration in the at least one SCG configuration comprises configuration information of a plurality of cells, and at least one cell of the plurality of cells is configured as a candidate primary secondary cell (PSCell);
receiving, by the network device, a measurement report from the terminal device, and the measurement report being used by the network device to determine whether to change the PSCell; wherein the change of the PSCell refers to changing the PSCell of the SCG from the first cell to a second cell; and
sending, by the network device, a PSCell change command to the terminal device, the PSCell change command carries third indication information, and the third indication information is used to instruct whether to update a tracking area (TA).

10. The cell configuration method according to claim 9, wherein the configuration information of the each cell in the plurality of cells carries first indication information, the first indication information is used to indicate whether the corresponding cell is the candidate PSCell.

11. The cell configuration method according to claim 10, wherein the configuration information of the cell further carries second indication information, and the second indication information is used to indicate whether the corresponding cell is a candidate PSCell in an active state.

12. The cell configuration method according to claim 9, wherein the first cell and the second cell belong to the same SCG, the first cell is the current PSCell of the SCG, the second cell is a target PSCell of the SCG to be changed, and the target PSCell is the candidate PSCell or the SCell in the SCG.

13. The cell configuration method according to claim 9, wherein the method further comprises:
sending, by the network device, a PSCell change command to the terminal device, and the PSCell change command comprising at least one of the following:
cell identity information of the target PSCell;
indication information of whether a random access procedure needs to be performed;

configuration information of special random access channel (RACH) resources;
downlink (DL) grant information of the target PSCell;
uplink (UL) grant information of the target PSCell;
indication information of identification of a bandwidth part (BWP), wherein the indication information of the BWP identification is used to indicate an active BWP of the terminal device on the target PSCell;
the T304, wherein the T304 is used to instruct the terminal device to execute the time threshold for PSCell change or addition;
RLF configuration parameters;
indication information of whether the RLF configuration parameters are changed;
a tracking area (TA) offset, wherein the TA offset is used for the terminal device to update the TA;
configuration information of signaling radio bearer (SRB).

14. The cell configuration method according to claim 9, wherein if the third indication information indicates to update the TA, the PSCell change command comprises configuration information of special RACH resources, and the terminal device performs a random access procedure based on the special RACH resources.

15. The cell configuration method according to claim 13, wherein the PSCell change command is used to trigger a PSCell change for one or more SCGs.

16. A cell configuration apparatus, comprising:

a transceiver; and a processor, coupled to the transceiver, and configured to receive, through the transceiver, first configuration information sent by a network device, wherein the first configuration information comprises at least one secondary cell group (SCG) configuration, and each SCG configuration in the at least one SCG configuration comprises configuration information of a plurality of cells, and at least one cell of the plurality of cells is configured as a candidate primary secondary cell (PSCell);

sending, through the transceiver, a measurement report to the network device, and the measurement report being used by the network device to determine whether to change the PSCell; wherein the change of the PSCell refers to changing the PSCell of the SCG from the first cell to a second cell; and receiving, through the transceiver, a PSCell change command sent by the network device, wherein the PSCell change command carries third indication information, and the third indication information is used to instruct whether to update a tracking area (TA).

* * * * *